United States Patent
Brown et al.

(10) Patent No.: US 6,778,742 B2
(45) Date of Patent: Aug. 17, 2004

(54) SIGNAL TRANSMITTING CABLE

(75) Inventors: George Henry Platt Brown, Galashiels (GB); David John Stockton, Suffolk (GB); Jonathan Paul Taylor, Melrose (GB)

(73) Assignee: Emtelle UK Limited (GB)

(*) Notice: Subject to any disclaimer, the term of this patent is extended or adjusted under 35 U.S.C. 154(b) by 0 days.

(21) Appl. No.: 10/239,118

(22) PCT Filed: Mar. 23, 2001

(86) PCT No.: PCT/GB01/01270
§ 371 (c)(1),
(2), (4) Date: Feb. 10, 2003

(87) PCT Pub. No.: WO01/73493
PCT Pub. Date: Oct. 4, 2001

(65) Prior Publication Data
US 2003/0156803 A1 Aug. 21, 2003

(30) Foreign Application Priority Data
Mar. 29, 2000 (GB) .............................. 0007443
Feb. 14, 2001 (GB) .............................. 0103584

(51) Int. Cl.$^7$ .............................................. G02B 6/44
(52) U.S. Cl. ................................... 385/100; 254/134.4
(58) Field of Search ................................ 385/100, 126, 385/147, 128; 254/134.4, 134.3 R, 134.3 FT

(56) References Cited

U.S. PATENT DOCUMENTS

| 5,293,442 A | 3/1994 | Sayegh | 385/102 |
| 5,555,335 A * | 9/1996 | Barker et al. | 385/100 |
| 5,922,995 A * | 7/1999 | Allen | 174/95 |
| 6,409,155 B1 * | 6/2002 | Brown et al. | 254/134.4 |
| 6,517,053 B1 * | 2/2003 | Griffioen et al. | 254/134.4 |

FOREIGN PATENT DOCUMENTS

| EP | 0 345 968 A2 | 12/1989 |
| EP | 0 345 968 A3 | 8/1990 |
| EP | 0 422 764 A2 | 4/1991 |
| EP | 0 422 764 A3 | 2/1992 |
| EP | 0 521 710 A1 | 1/1993 |
| EP | 0 646 818 A1 | 4/1995 |
| EP | 0 752 604 A1 | 1/1997 |
| JP | 04186206 | 7/1992 |
| WO | WO 97/03376 | 1/1997 |
| WO | WO 99/35525 | 7/1999 |

* cited by examiner

Primary Examiner—Tuslidas C. Patel
(74) Attorney, Agent, or Firm—Daniel B. Schein, Esq.

(57) ABSTRACT

An optical fibre cable (1) for installation in a duct (51) by means of fluid flow is described. The cable (1) has a signal transmitting portion comprising a plurality of elongate, flexible optical fibres, surrounded by a braided covering (10) formed from textile yarns (9). The apparatus (50) for installing the cable includes an air compressor (52) for supplying a blowing head (53) with a conditioned air supply substantially free of static electricity or moisture. The blowing head (53) includes drive wheels (not shown), the speed of rotation of which (and hence the speed of installation of the fibre cable (1), (101) is adjusted by means of s control unit (54) powered by power supply (55). The fibre cable (1), (101) is fed from a fibre pan (56) over guide (57) to the blowing head (53), which is fed with an air supply from compressor (52) which is regulated by dispenser (58).

30 Claims, 7 Drawing Sheets

Notes
2 Laps
Total Distance 1,040m
All bends are radius > 4m unless stated otherwise Key Duct ———
Field Boundary —·—
Start △
Finish ○
Severe Bend ●

| Bend Details | | | | |
|---|---|---|---|---|
| Lap | Bend Identifier | Cumulative Distance from | Details | Diagram |
| One | A | 132 | 90°, radius 1.1m | |
| | B | 230 | 90°, 180°, 90° radius=0.4m, h=2.2m | |
| | C | 440 | 90°, 180°, 90° radius=0.4m, h=4.5m | |
| Two | A | 652 | 90°, radius 1.1m | |
| | B | 750 | 90°, 180°, 90° radius=0.4m, h=2.2m | |
| | C | 960 | 90°, 180°, 90° radius=0.4m, h=4.5m | |

TABLE 1

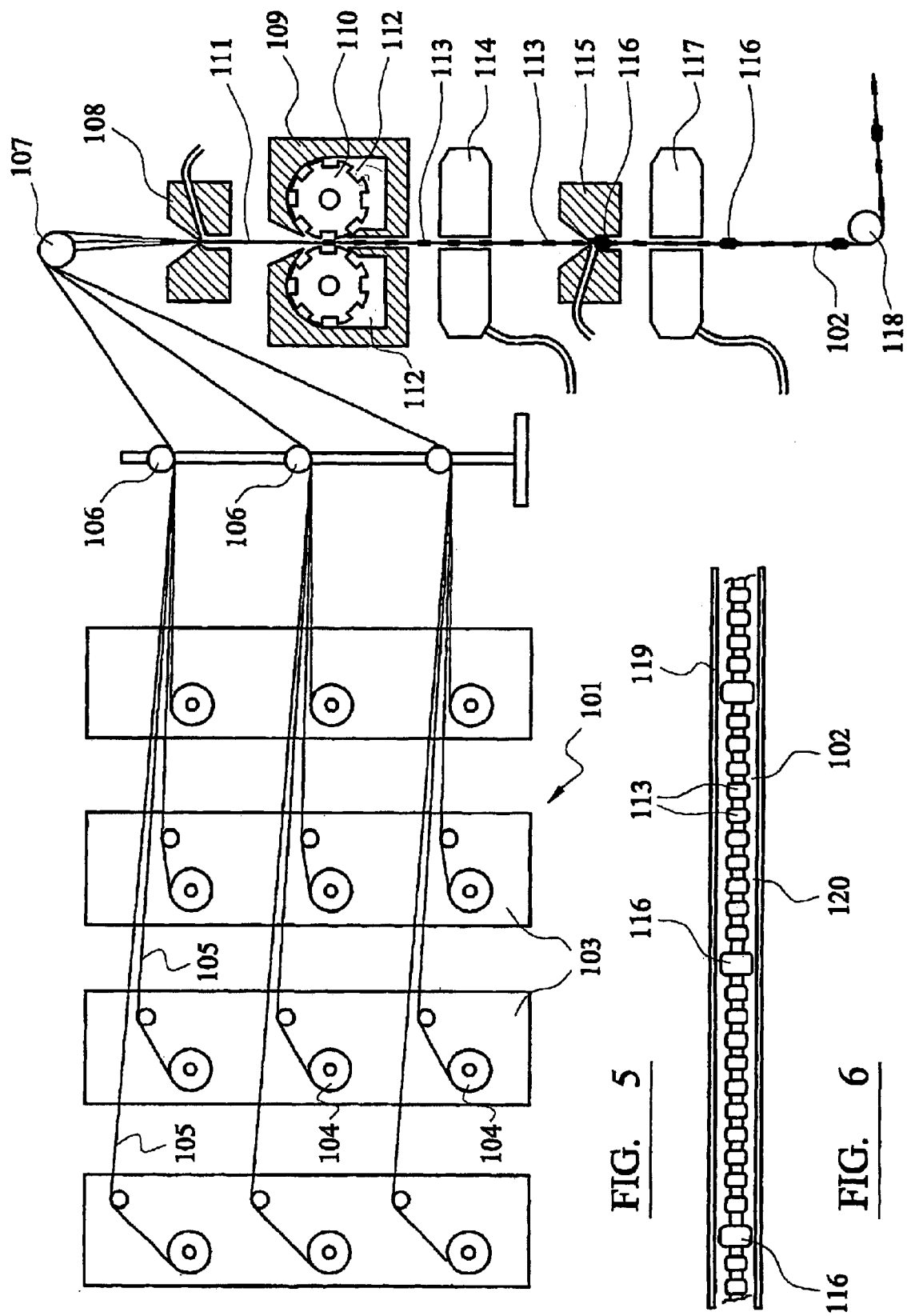

SIGNAL TRANSMITTING CABLE

FIELD OF THE INVENTION

The present invention relates to signal transmitting cables for installation in ducts, and relates particularly, but not exclusively, to optical fibre light signal transmitting cables for installation into underground ducts or into buildings.

BACKGROUND OF THE INVENTION

It is common to transmit telecommunication signals by means of optical fibre cables installed in underground ducts. In order to minimise the number of persons needed to install such cables, and therefore minimise the installation cost, it is known to install cables consisting of bundles of flexible optical fibres into ducts by means of compressed air. An end of the cable is inserted into one end of a duct, and the cable is then blown into the duct by means of compressed air, fluid drag between the moving air and the surface of the cable causing the cable to move axially along the duct. It is known to provide such cables consisting of optical fibres encapsulated in a thin plastic sheath, which is then encapsulated in a thicker foam plastic layer. The foam plastic layer makes the cable relatively light in weight, but provides it with a large surface area, giving good fluid drag as air passes over it in the installation process.

However, cables of this type, known to persons skilled in the art as MK I cables, suffer from the drawback that because the cable is relatively large in diameter, it is necessary to use a large diameter duct for installation of the cable in order to achieve commercially acceptable installation distances. In the case of telecommunications cables being installed in duct networks, especially in city centre locations where space in underground ducts is scarce because of the very high number of customers and the high cost of construction, it is undesirable to use large ducts. In addition, MK I cables usually use polyethylene foam outer layers, which have relatively poor friction characteristics when in contact with the internal surface of the installation tube, which in turn restricts the blowing distances achievable with this product.

An attempt to solve this problem, known to persons skilled in the art as an MK II cable, is disclosed in International patent application number WO 93/01512, UK Patent application number GB 2282897, and European patent application numbers EP 0422764, EP 0752604 and EP 0345968. In this type of cable, the optical fibres are coated in a two stage process, and the outer layer contains microscopic glass spheres designed to provide a rough surface to enhance fluid drag, while providing a low friction contact surface between the optical fibre cable and the tube. The use of microscopic glass spheres means that the outer layer can be significantly thinner than the foam outer layer of the MK I cable, and the improved friction performance means that this type of prior art cable can be installed over commercially satisfactory distances in smaller diameter ducts.

However, there has persisted a commercial requirement for optical fibre cables which are capable of installation by blowing over longer distances than are possible with the MK II cable, since if the number of optical fibre splices in a cable network can be reduced, the installation time and cost can be reduced and the process can be made suitable for a wider range of applications.

SUMMARY OF THE INVENTION

Preferred embodiments of the present invention seek to provide a signal transmitting cable which can be blown into a duct over longer distances than in the prior art.

According to an aspect of the present invention, there is provided a signal transmitting cable for installation in a duct by means of fluid flow, the cable comprising:

a signal transmitting portion comprising at least one elongate, flexible, signal transmitting, member; and a covering surrounding said signal transmitting portion and having on the outer surface thereof at least two sets of variations in diameter, including a first set of protrusions and/or depressions and a second set of protrusions having respective first and second average amplitudes in a radial direction of the signal transmitting portion and respective first and second average spacing in a respective further second direction along the surface of said covering;

wherein said second average amplitude is greater than said first average amplitude, and said second average spacing is greater than said first average spacing.

By providing a first set of protrusions or depressions and a second set of protrusions, where the average amplitude and spacing of the second set is greater than those of the first set, this provides the highly surprising and advantageous effect of significantly increasing the blowing performance of a signal transmitting cable compared with the prior art cables. It is believed that this effect is achieved by means of the second set of protrusions minimising the area of contact between the signal transmitting cable and the internal surface of the tube (thus minimising friction between the cable and the tube), and the first said of protrusions or depressions at the same time increasing fluid drag between the cable and the compressed fluid blowing the cable into the tube.

At least one said further direction second may be substantially parallel to the axis of said signal transmitting portion.

At least one said further direction may extend helically around said signal transmitting portion.

The first average spacing is preferably arranged such that the air drag imparted to a section of the cable in use during blowing into a tube exceeds $$A_a(p_1-p_2)S_c/(S_c+S_d), \text{ where}$$

$A_a$ is the average cross-sectional area of fluid flowing between the section of the cable and the tube;

$(p_1-p_2)$ is the fluid pressure difference between the ends of the section of cable;

$S_c$ is the average cross-sectional external perimeter length of the section of cable; and $S_d$ is the average cross-sectional internal perimeter length of the tube surrounding the section of cable.

In a preferred embodiment, said first average spacing is less than substantially 30 mm.

In a preferred embodiment, the covering comprises at least one coating of material, and said first set of protrusions or depressions is provided on the outermost said coating.

At least one said coating may be of plastics material.

A said first set of protrusions may be printed on the outermost said coating.

In a preferred embodiment, the covering comprises at least one intermittent coating of material, and said second set of protrusions is provided on the outermost said intermittent coating.

At least one said intermittent coating may comprise plastics material.

The second set of protrusions may comprise variations in diameter of the outermost said intermittent coating.

The variations in diameter may be formed by varying the pressure of said plastics material during formation of the outermost said intermittent coating.

The outermost said intermittent coating may be formed by spraying.

In a preferred embodiment, the covering is at least partially formed by extrusion.

The covering may be at least partially formed from crossed textile fibres.

The covering may include fibres of different lateral thicknesses.

The covering may include a mixture of fibres of substantially flattened and substantially circular cross section.

The covering may include fibres of different diameters.

The covering may be braided.

The covering may be woven.

The covering may be knitted.

At least one said fibre may be formed from a plurality of filaments.

In a preferred embodiment, at least one said signal transmitting member is an optical signal transmitting member.

One or more said optical signal transmitting member may be an optical fibre.

At least one said signal transmitting member may be a conductor for transmitting an electrical signal.

The cable preferably further comprises at least one sheath surrounding at least one said signal transmitting member.

The cable may comprise a plurality of said signal transmitting members, and an adhesive layer arranged between at least one pair of adjacent said signal transmitting members.

The second set of protrusions may be provided with a friction reducing coating.

According to another aspect of the invention, there is provided a method of forming a signal transmitting cable as defined above, the method comprising forming said covering around said signal transmitting portion.

The step of forming said covering may include forming at least one coating of material around said signal transmitting portion, and providing said first set of protrusions and/or depressions on the outermost said coating.

A first set of said protrusions may be formed on said outermost coating by means of printing.

The step of providing said second set of protrusions on the outermost said coating may comprise varying the pressure of said material during formation of said coating.

The pressure of said material may be varied by means of a gear pump.

The pressure of said material may be varied by means of at least one solenoid valve.

The step of forming said outermost coating may comprise spraying said outermost coating onto the cable.

The step of forming said covering may comprise at least partially extruding said covering.

The step of forming said covering around said signal transmitting portion may comprise forming said covering of crossed textile fibres.

The step of forming said covering may comprise braiding said textile fibres.

The step of forming said covering may comprise forming said covering from textile fibres of different lateral thicknesses.

The step of forming said covering may comprise forming said covering from textile fibres of different diameters.

The step of forming said covering may comprise forming said covering from a mixture of fibres of substantially flattened and substantially circular cross section.

The method preferably further comprises the step of providing said second set of protrusions with a friction reducing coating.

The first set of protrusions and/or depressions and/or said second set of protrusions may be arranged helically around said covering.

Preferred embodiments of the invention will now be described, by way of example only and not in any limitative sense, with reference to the accompanying drawings, in which:-

BRIEF DESCRIPTION OF THE DRAWINGS

FIG. 5 is a schematic view of an apparatus for forming an optical fibre cable of a second embodiment of the present invention;

FIG. 6 is a schematic cross-sectional view of a duct containing an optical fibre cable formed by the apparatus of FIG. 5;

FURTHER DETAILS OF THE INVENTION

Figure 1:
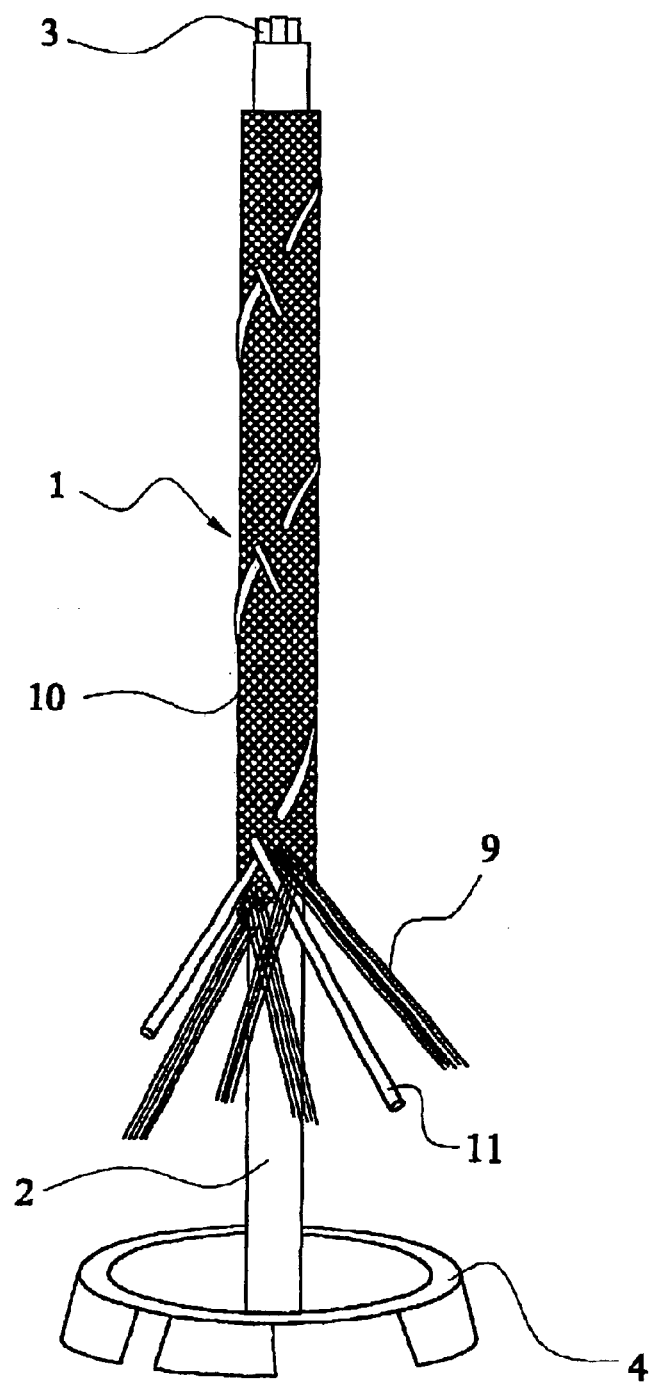
FIG. 1 is a side perspective view of a fibre optic cable of a first embodiment of the present invention.

Referring to FIG. 1, an optical fibre cable 1 of a first embodiment of the invention is made by taking a cable containing twelve optical fibres 3, encapsulated in a plastic sheath 2, for example a prior art MK II cable manufactured in accordance with the process described in the prior art documents mentioned above. The fibre bundle is pulled from a fibre pan through an orifice 4 of a braiding head (not shown) having two counter-rotating sinusoidal tracks, as will be familiar to persons skilled in the art.

The braiding head is provided with counter rotating sinusoidal tracks, each of which carries yarn carriers carrying textile yarns, the yarns being arranged in an intertwined configuration, and is provided with an eyelet arranged centrally above the yarn carriers. The yarns are passed though the eyelet to converge and are then passed through geared capstans to form a braided covering 10 by means of a braid known as a maypole braid. In the arrangement shown in FIG. 1, the braided covering 10 formed contains a mixture of light multifilaments 9 and heavy monofilaments 11. Ten fibres of such multifilament 9 are used, as well as two 180 Denier continuous monofilament nylon yarns 11. The 180 Denier yarn is approximately three times the lateral thickness of the 140 D/tex multifilament. The braided covering 10 formed by this process has a number of small amplitude protrusions at the crossing points of the multifilaments 9, and a number of larger amplitude protrusions at the crossing points of the monofilaments 11. It can be seen that the axial spacing of the large amplitude protrusions is greater than that of the small amplitude protrusions.

Comparative Example 1

Figure 2:
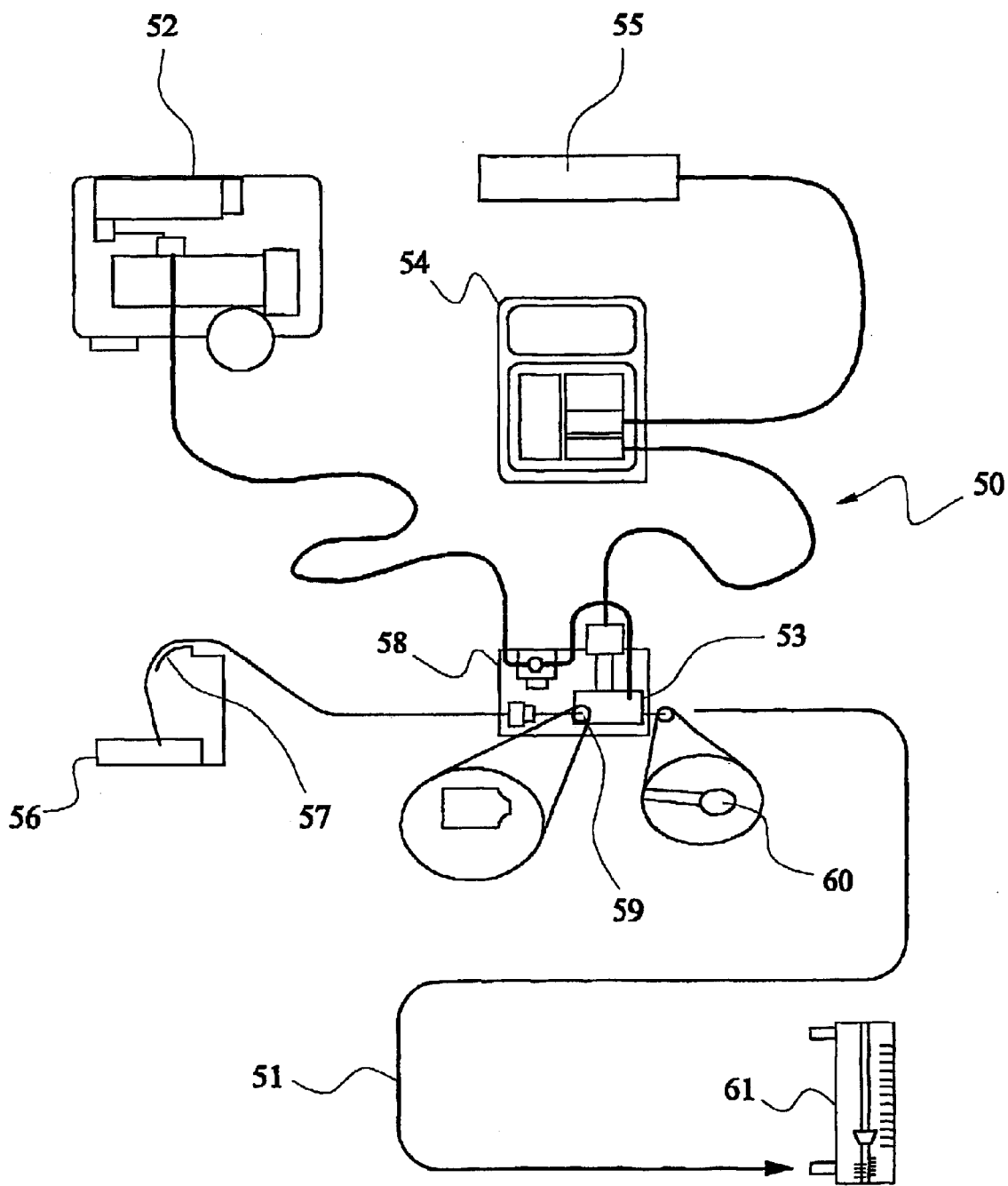
FIG. 2 is a schematic view of an apparatus for use in blowing the cable of FIG. 1 into a duct.

FIG. 2 shows an apparatus 50 for installing the optical fibre cable 1 of FIG. 1 into a duct 51. The apparatus 50 includes an air compressor 52 for supplying a blowing head 53 with a conditioned air supply substantially free of static electricity or moisture. The blowing head 53 includes drive wheels (not shown), the speed of rotation of which (and hence the speed of installation of the fibre cable 1) is adjusted by means of a control unit 54 powered by power supply 55. The optical fibre cable 1 is fed from a fibre pan 56 over guide 57 to the blowing head 53, which is fed with an air supply from compressor 52 which is regulated by dispenser 58.

The blowing head 53 is also provided with a seal 59 to minimise air leakage through the back of the blowing head during installation, and a blowing bead 60 is attached to the forward end of the fibre cable 1 before blowing, to guide the cable through any connectors and sharp bends of the duct 51, which is clamped tothe blowing head 53. A flow meter 61 is provided at the end of the duct 51 remote from the blowing head 53 to measure the rate of air flow.

Figure 3:
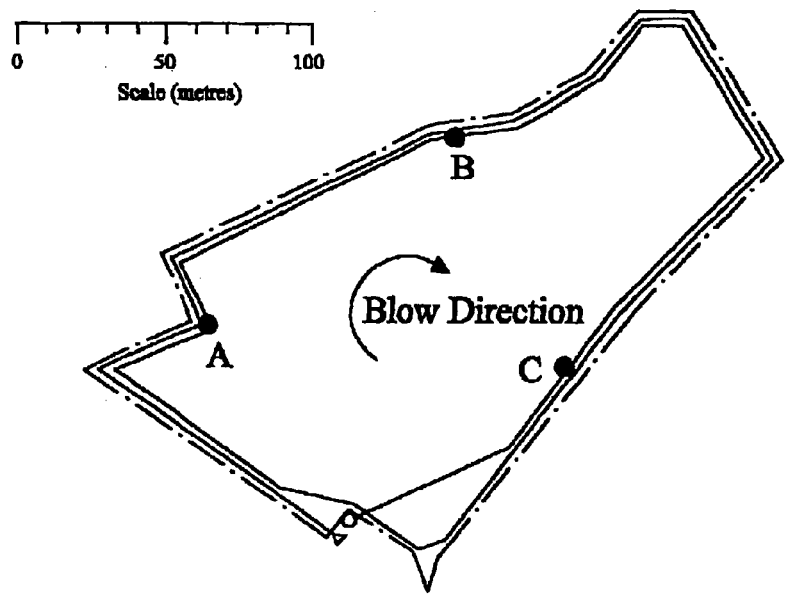
FIG. 3 is a schematic illustration of a track used in Comparative Example 1.

Referring now to FIG. 3, 1 km lengths L2 of the fibre cable 1 of FIG. 1 were blown through a duct 51 of outside diameter 5 mm and inside diameter 3.5 mm along two laps of the route shown. A braided optical fibre cable L1 having a braided coating made from yarns of equal thickness was also blown through the duct. Table 1 provides details of bends provided on the track. An uncoated MKII fibre optic cable L3 was also blown along the same route.

Figure 4:
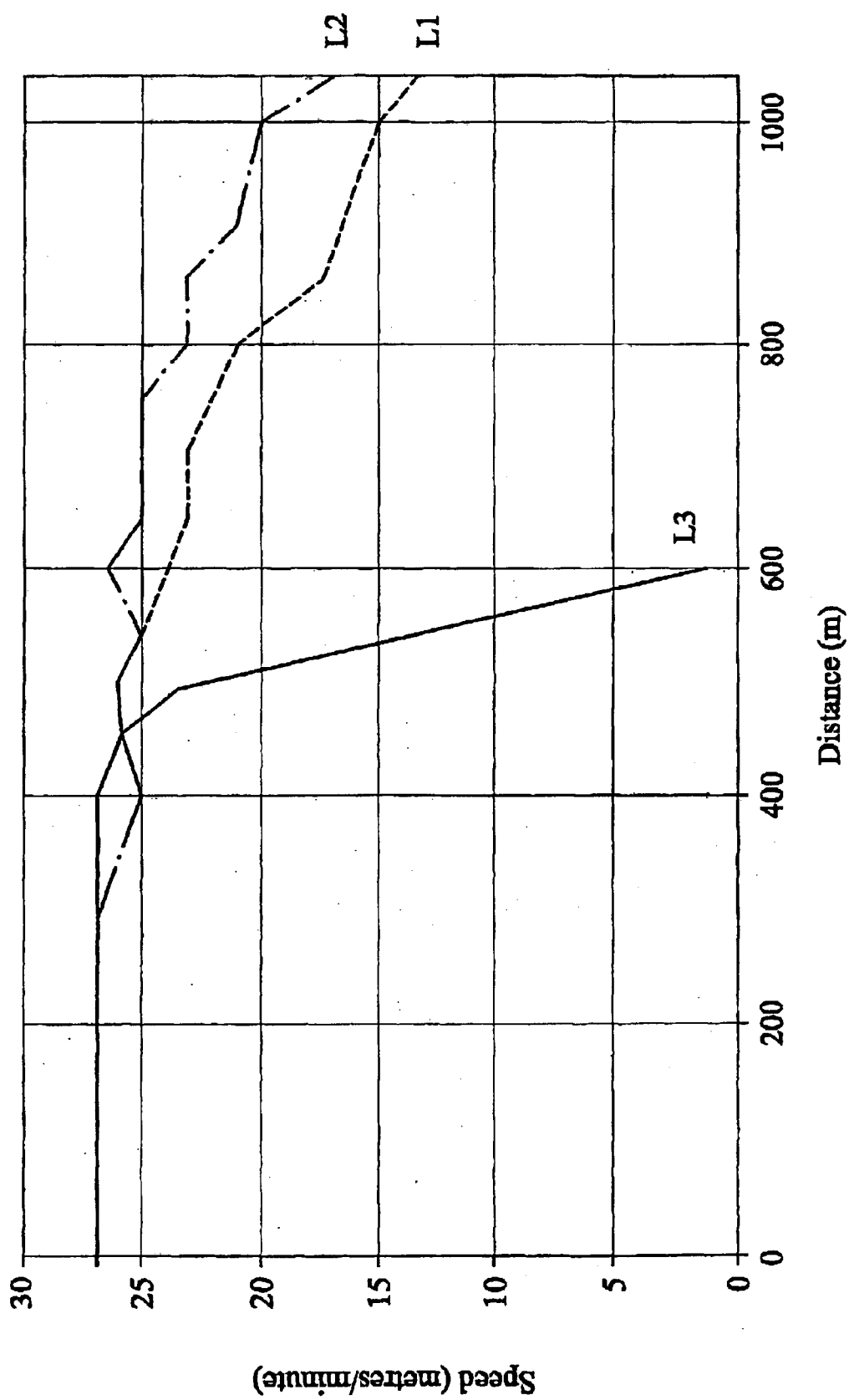
FIG. 4 is a graph of comparative blowing performance in Comparative Example 1.

FIG. 4 shows the results of blowing performance, on which curve L3 shows that the installation speed of the conventional MKII fibre optic cable started to reduce after an installation distance of approximately 400 m, and then rapidly declined. Curve L1, on the other hand, shows that the fibre optic cable having yarns of a single thickness was still travelling with an installation speed of 15 m per minute after a blowing distance of 1000 m. However, and curve L2 shows that the cable 1 of FIG. 1 achieved even better blowing performance. It can therefore be seen that providing a covering of braided textile fibres of mixed thicknesses significantly improves the blowing performance of the cable.

Table 1 shows the coefficient of friction and air drag for the three fibre optic cables of FIG. 4.

TABLE 1

| Cable | Coefficient of friction | Air drag at 2 Bar (gf) |
| --- | --- | --- |
| L1 | 0.12 | 72 |
| L2 | 0.09 | 84 |
| L3 | 0.1 | 36 |

Referring now to FIG. 5, an apparatus 101 for forming an optical fibre cable 102 of a second embodiment of the invention includes banks 103 of tension controlled fibre payoff reels 104 delivering a total of twelve primary coated optical fibres 105, i.e. optical fibres comprising a light transmitting portion surrounded by a protective sheath.

The optical fibres 105 pass over guide wheels 106 and dancers for controlling the tension in the optical fibres 105, around a guide wheel 107 and are then coated with liquid thermoplastic material (for example epoxy acrylate material) in a coating unit 108 to form a continuous coating on the optical fibres 105. the coated fibre bundle 111 is then fed into a printing unit 109 having a pair of opposed rollers 110 having slots 112 which apply ink to the optical fibre bundle 111. This produces a series of bands or protrusions 113 which protrude radially outwards from the optical fibre bundle 111. The ink and coating are then cured by passage past an ultraviolet lamp 114. Alternatively, the coating may be cured prior to application of the ink in the printing unit 109.

After curing by the ultraviolet lamp 114, the bundle 111 passes through a further coating section 115 where it is coated intermittently with liquid thermoplastic resin material such as epoxy acrylate material. A gear pump or bank of solenoid valves with mutually offset cycles (not shown) is used to create pulsed pressure variations in the liquid resin material, which causes beads 116, of greater amplitude than the printed protrusions 113 and spaced further apart than the printed protrusions 113, to be formed in the intermittent coating formed on the bundle 111. Alternatively, the intermittent coating forming the beads 116 may be sprayed onto the bundle 111 in the further coating section 115, and may include a friction reducing component. The coating applied to the bundle 111 is then cured by a second ultraviolet lamp 117, and then passed around a guide roller 118.

It can be seen from FIG. 6 that the coated optical fibre bundle 111 has a series of closely spaced protrusions 113 of small amplitude and beads 116 of larger amplitude spaced further apart than the closely spaced protrusions 113. It is believed that in blowing the fibre bundle 111 through a duct 119 by means of compressed air 120, the protrusions 113 increase the fluid drag acting on the fibre bundle 111, and the beads 116 reduce the points of frictional contact with the wall of the duct 119. It will be appreciated by persons skilled in the art that FIG. 6 is provided for illustrative purposes only, and that the dimensions of the variations in diameter of the bundle 111 are greatly exaggerated.

Figure 7:
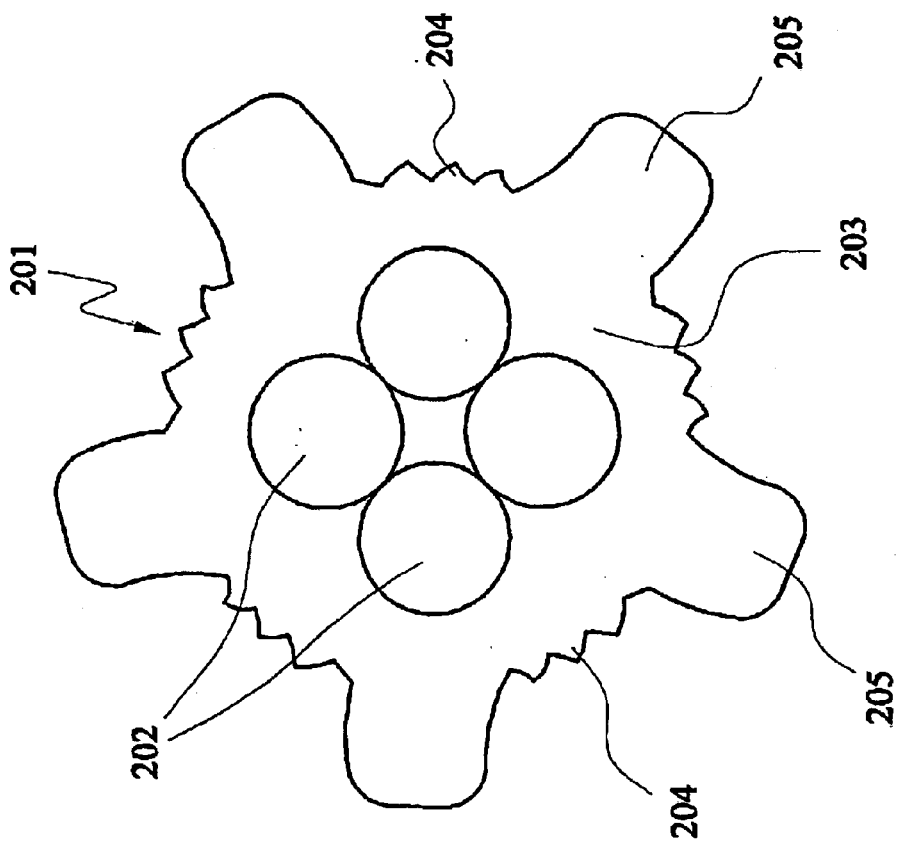
FIG. 7 is a cross sectional view of an optical fibre cable of a third embodiment of the present invention.

FIG. 7 shows a cross sectional view of an optical fibre cable 201 of a third embodiment of the invention. The cable 201 includes a signal transmitting portion comprising four coated optical fibres 202, and a coating 203 of plastics material formed around the signal transmitting portion. The coating 203 has a set of small protrusions 204 for increasing the fluid drag on the cable 201 when it is blown into a duct (not shown), and a set of large protrusions 205 for minimising frictional contact with the internal wall of the duct. The coating 203 is formed by means of extrusion around the signal transmitting portion by extrusion through a die (not shown) having an internal profile complementary to the external profile of the coating 203. In this way, the small 204 and large 205 protrusions are formed in a single step.

Figure 8:
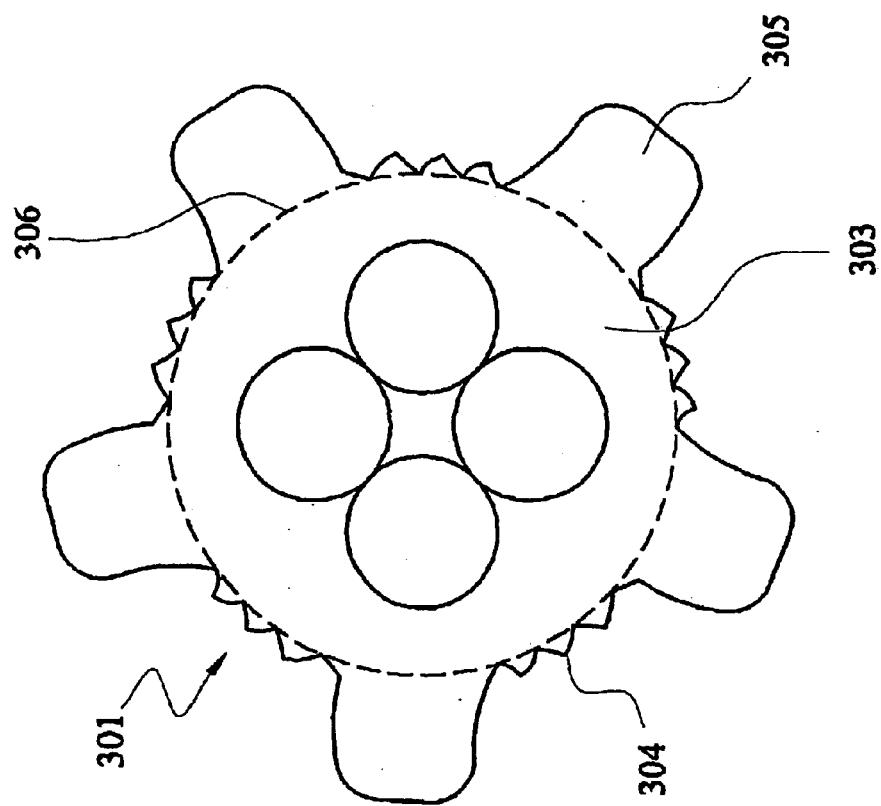
FIG. 8 is a cross sectional view of an optical fibre cable of a fourth embodiment of the present invention.

FIG. 8, in which parts common to the embodiment of FIG. 7 are denoted by like reference numerals but increased by 100, shows a cross sectional view of a cable 301 of substantially identical construction to the cable 201 of FIG. 7, but has a coating 303 formed in two steps. In the first step, the coating 303 is formed radially outwards as far as dotted line 306, and that part of the coating radially outwards of the line 306, including smaller 304 and larger 305 protrusions, is formed in a second extrusion step. In this way, the coating 303 can be formed from two separate materials, for example a material having suitable properties of flexibility for radially inwards of the line 306, and a material having suitable properties for formation of the protrusions 304, 305.

Referring again to FIG. 6, the dimensions and spacing of the projections 113 necessary to achieve improved blowing performance are determined according to the following relationship, where $\delta_L$ is the height of a laminar layer of compressed air above the surface of an optical fibre bundle 111 not provided with protrusions 113, and e is the average projection height of a protrusion 113 above the surface of an optical fibre bundle 111 not having protrusions 113:

for entirely smooth flow at $\delta_L < 6e$, so for roughness to have an affect $\delta_{L/6} < e$;

for rough flow $\delta_L/0.3 < e$.

$\delta_L$, the height of the laminar layer above the optical fibre bundle 111 is further given by the following relationship $$\delta_L = \frac{32.8D}{Re\sqrt{f}} \qquad \text{Equation 1}$$

where $R_e$, Reynolds number, is given by $R_e = DV/v$, and $D$=hydraulic diameter $f$=fluid friction factor, defined as $$f = \frac{h_r}{(L/D)V^2/2 \text{ g}},$$

where g=acceleration due to gravity $h_L$=fluid head loss

L=length of duct and fibre combination $\upsilon$=kinematic viscosity of fluid

V=general fluid velocity.

In practical situations, case 1 in Table 2 represents the highest value of the denominator of equation 1 typically encountered, and case 2 represents the lowest value typically encountered.

TABLE 2

|  | $R_e$ | f | Denominator ($R_{e \sqrt{f}}$) |
| --- | --- | --- | --- |
| Case 1 | 40000 | 0.2 | 17888.54382 |
| Case 2 | 2000 | 0.032 | 357.7708764 |

Figure 9:
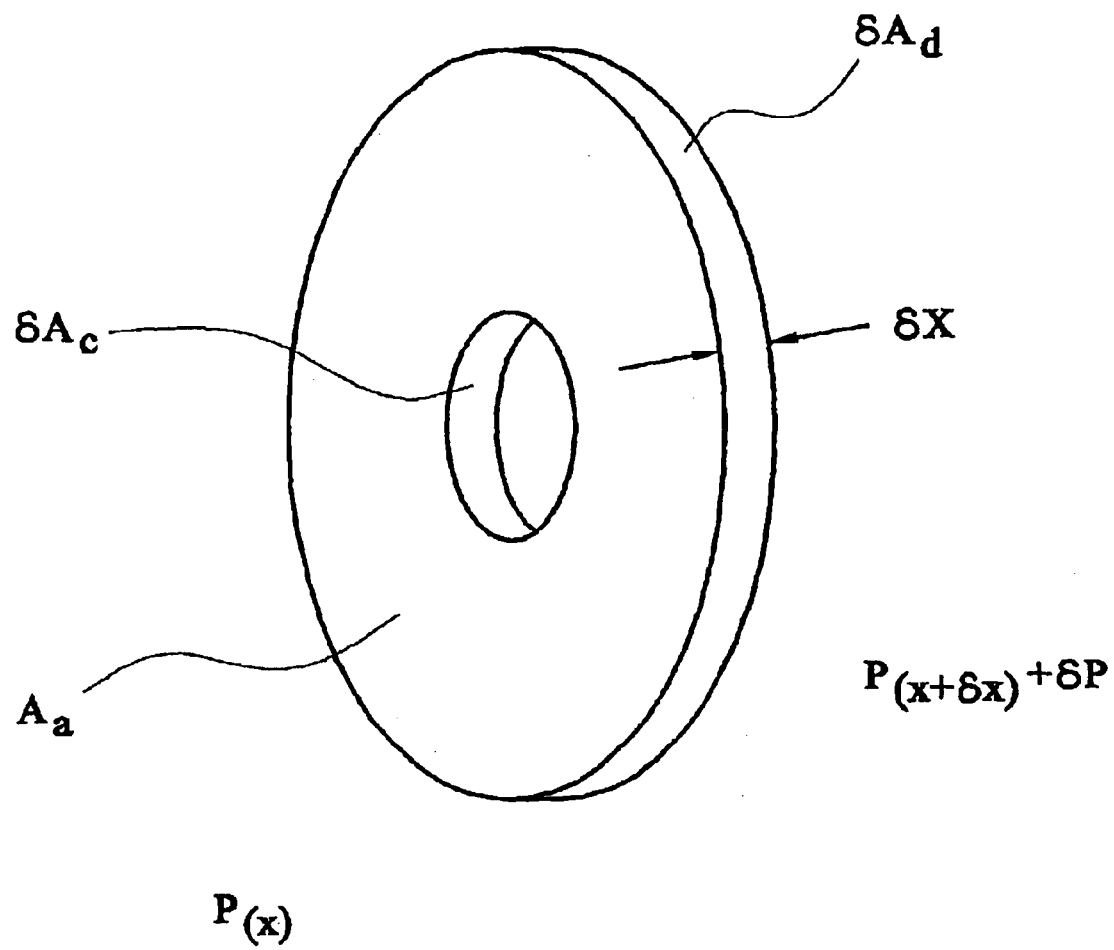
FIG. 9 is a schematic representation of an annulus of fluid located between the optical fibre cable of the invention and a duct, for use in calculating the fluid drag on the cable.

A method of estimating the fluid drag acting on the cable 102 of FIG. 6 is described with reference to FIG. 9, which shows a thin annulus of fluid located between the cable 102 and the duct 119 into which the cable 102 is being blown.

In the case of the cable 102 being blown into the duct 119 at uniform speed, the force acting on the annulus due to the pressure drop across the annulus will be equal to the forces exerted by the annulus due to fluid friction. In addition, the fluid drag acting on the cable 102 will be proportional to the area of that part of the cable surrounded by the annulus. In other words:

$\delta F = A_a$. (area of section of cable)/(area of section of cable+duct), i.e. $\delta F = A_a \cdot \delta p \times \delta A_c/(\delta A_c + \delta A_d) = A_a \cdot \delta p \times S_c/(S_{a+Sc})$.

It can therefor be seen that the total force acting on a section of cable is given by:

$F = \int_{p2}^{p1} dF = A_a S_c (p_1 - p_2)/(S_c + S_d)$, where $A_a$ is the cross sectional area of the annulus;

$A_c$ is the surface area of the cable section;

$A_d$ is the internal area of the duct surrounding the cable section;

F is the fluid drag acting on the cable section;

p is the fluid pressure in the duct;

$S_c$ is the cross sectional perimeter length of the cable section; and $S_d$ is the cross sectional perimeter length of the duct internal wall.

It will be appreciated by persons skilled in the art that the above embodiments have been described by way of example only, and not in an limitative sense, and that various alterations and modifications are possible without departure from the scope of the invention as defined by the appended claims. For example, the protrusions have been described in terms of their average separation in an axial direction of the cable, but it will be understood that the protrusions could be arranged helically around the cable, for example in a so-called S-Z arrangement in alternating senses to reduce any turning moment applied to the cable on blowing into the duct.

What is claimed is:

1. A signal transmitting cable for installation in a duct by means of fluid flow, the cable comprising:

a signal transmitting portion comprising at least one elongate, flexible, signal transmitting member; and a covering surrounding said signal transmitting portion and having on the outer surface thereof a first set of protrusions and a second set of protrusions having respective first and second average radial amplitudes in a first direction of the signal transmitting portion and respective first and second average spacing in a respective second direction along the surface of said covering;

wherein the second average amplitude is greater than the first average amplitude, and the second average spacing is greater than the first average spacing.

2. A cable according to claim 1, wherein said second direction is substantially parallel to the axis of said signal transmitting portion.

3. A cable according to claim 1, wherein said second direction extends helically around said signal transmitting portion.

4. A cable according to claim 1, wherein said first average spacing is arranged such that the air drag imparted to a section of the cable in use during blowing into a tube exceeds $Aa(p1-p2)Sc/(Sc+Sd)$, where Aa is the average cross-sectional area of fluid flowing between the section of the cable and the tube;

$(p_1-p_2)$ is the fluid pressure difference between the ends of the section of cable;

$S_c$ is the average cross-sectional external perimeter length of the section of cable; and $S_d$ is the average cross-sectional internal perimeter length of the tube surrounding the section of cable.

5. A cable according to claim 1, wherein said first average spacing is less than about 30 mm.

6. A cable according to claim 1, wherein said covering comprises at least one coating of material, and said first set of protrusions is provided on the outermost said coating.

7. A cable according to claim 6, wherein at least one said coating comprises plastic.

8. A cable according to claim 6, wherein said first set of protrusions is printed on the outermost said coating.

9. A cable according to claim 1, wherein said covering comprises at least one intermittent coating of material, and said second set of protrusions is provided on the outermost said intermittent coating.

10. A cable according to claim 9, wherein at least one said intermittent coating comprises plastic.

11. A cable according to claim 9, wherein said second set of protrusions comprises variations in diameter of the outermost said intermittent coating.

12. A cable according to claim 11, wherein said variations in diameter are formed by varying the pressure of plastics material during formation of the outermost said intermittent coating.

13. A cable according to claim 11, wherein the outermost said intermittent coating is formed by spraying.

14. A cable according to claim 1, wherein said covering is at least partially formed by extrusion or from crossed textile fibres.

15. A cable according to claim 14, wherein the covering comprises fibres selected from the group consisting of (a) fibres of different lateral thicknesses, (b) a mixture of fibres of substantially flattened and substantially circular cross section, (c) fibres of different diameters, (d) braided fibres, (e) woven fibres, (f) knitted fibres, and (g) fibres comprising at least one fibre formed from a plurality of filaments.

16. A cable according to claim 1, wherein at least one said signal transmitting member is an optical signal transmitting member.

17. A cable according to claim 16, wherein at least one of said at least one said signal transmitting member is an optical fibre.

18. A cable according to claim 1, wherein at least one said signal transmitting member is a conductor for transmitting an electrical signal.

19. A cable according to claim 1, further comprising at least one sheath surrounding at least one said signal transmitting member.

20. A cable according to claim 1, comprising a plurality of said signal transmitting members, and an adhesive layer arranged between at least one pair of adjacent said signal transmitting members.

21. A cable according to claim 1, wherein said second set of protrusions is provided with a friction reducing coating.

22. A method of forming a signal transmitting cable for installation in a duct by means of fluid flow, the cable comprising:

a signal transmitting portion comprising at least one elongate, flexible, signal transmitting member; and a covering surround said signal transmitting portion and having on the outer surface thereof a first set of protrusions and a second set of protrusions having respective first and second average radial amplitudes in a first direction of the signal transmitting portion and respective first and second average spacing in a respective second direction along the surface of said covering;

wherein the second average amplitude is greater than the first average amplitude, and the second average spacing is greater than the first average spacing.

the method comprising forming said covering around said signal transmitting portion.

23. A method according to claim 22, wherein the step of forming said covering includes forming at least one coating of material around said signal transmitting portion, and providing said first set of protrusions on the outermost said coating.

24. A method according to claim 23, wherein said first set of protrusions is formed on said outermost coating by means of printing.

25. A method according to claim 23, wherein the step of providing said second set of protrusions on the outermost said coating comprises varying the pressure of said material during formation of said coating.

26. A method according to claim 25, wherein the pressure of said material is varied by a means selected from the group consisting of a gear pump, and at least one solenoid valve.

27. A method according to claim 23, wherein the step of forming said outermost coating comprises spraying said outermost coating onto the cable.

28. A method according to claim 23, wherein the step of forming said covering comprises a step selected from the group of steps consisting of (a) at least partially extruding said covering, (b) forming said covering of crossed textile fibres, (c) forming said covering of crossed textile fibres and braiding said textile fibres, (d) forming said covering from textile fibres of different lateral thicknesses, (e) forming said covering from textile fibres of different diameters, and (f) forming said covering from a mixture of fibres of substantially flattened and substantially circular cross section.

29. A method according to claim 22, further comprising the step of providing said second set of protrusions with a friction reducing coating.

30. A method according to claim 22, wherein said first set of protrusions and/or depressions and/or said second set of protrusions are arranged helically around said covering.

* * * * *